United States Patent
Chan et al.

(10) Patent No.: US 8,280,121 B2
(45) Date of Patent: Oct. 2, 2012

(54) METHOD OF ESTABLISHING SKIN COLOR MODEL

(75) Inventors: Chen-Hung Chan, Taoyuan County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 813 days.

(21) Appl. No.: 12/424,750

(22) Filed: Apr. 16, 2009

(65) Prior Publication Data
US 2010/0166310 A1  Jul. 1, 2010

(30) Foreign Application Priority Data
Dec. 31, 2008  (TW) ................................ 97151816 A

(51) Int. Cl.
*G06K 9/62* (2006.01)
(52) U.S. Cl. ........................................................ 382/118
(58) Field of Classification Search .................... None
See application file for complete search history.

(56) References Cited

U.S. PATENT DOCUMENTS

| | | | |
|---|---|---|---|
| 7,218,759 B1 | 5/2007 | Ho et al. | |
| 2006/0088210 A1* | 4/2006 | Yu et al. | 382/167 |
| 2009/0074258 A1* | 3/2009 | Cotgreave | 382/118 |
| 2011/0299774 A1* | 12/2011 | Manders et al. | 382/168 |

* cited by examiner

*Primary Examiner* — Brian P Werner
(74) *Attorney, Agent, or Firm* — Morris Manning & Martin LLP; Tim Tingkang Xia, Esq.

(57) ABSTRACT

A method of establishing a skin color model includes the following steps. A human face detecting procedure is performed on an input image, and a human face area in the input image is circled through a selecting window. A skin color model is established by using a Gaussian probability distribution function (PDF) according to color information in the selecting window. When the skin color model established in the above step is applied to skin color detection, pixels having the skin color in the input image are detected through the skin color model and a Mahalanobis distance computing procedure.

3 Claims, 5 Drawing Sheets

---

Step 210: Perform a human face detecting procedure on an input image, and circle a human face area in the input image through a selecting window

↓

Step 220: Establish a skin color model according to color information in the selecting window

↓

Step 230: Perform a skin color detecting procedure, so as to detect remaining pixels having the skin color in the input image according to the skin color model

METHOD OF ESTABLISHING SKIN COLOR MODEL

CROSS-REFERENCE TO RELATED APPLICATIONS

This application claims priority under 35 U.S.C. §119(a) on Patent Application No. 097151816 filed in Taiwan, R.O.C. on Dec. 31, 2008, the entire contents of which are hereby incorporated by reference.

BACKGROUND OF THE INVENTION

1. Field of Invention

The present invention relates to a method of establishing a color model for a digital image, in particular, to a method of establishing a skin color model for a digital image.

2. Related Art

For the current skin color detection, a great many images are collected in advance. After the skin colors of different races are collected, a skin color model is established by using a mixture of Gaussian probability distribution function (PDF). Skin color pixels in the image are then detected with the model.

During the detection performed by using the skin color model established in the above manner, a color space conversion or a nonlinear conversion is additionally required, such that the computing cost is relatively high and the process is complicated. Besides, as an overlapping area of the skin color and the non-skin color is quite large, misjudgment may easily occur, and the misjudged parts generally do not utilize the subsequent image processing.

In order to solve the above problems, U.S. Pat. No. 7,218,759, entitled "Face detection in digital images", discloses the following technical means. Firstly, corresponding color distribution models are established according to a plurality of different digital images. Next, input images shot under different light sources are input. Then, the input images are analyzed by using the color distribution models. According to the method, in addition to a large amount of memory space, processing operations are required.

In practice, a model with a high complexity requires a large amount of computation, and thus does not conform to the real-time processing. If it intends to reduce the amount of computation, it is necessary to spread and save the model data in a storage device. However, the spread data is quite large, and the required storage space is also very huge.

SUMMARY OF THE INVENTION

In order to solve the above problems, the present invention is a method of establishing a skin color model for a digital image, adapted to perform a skin color detection on an input image.

Thereby, a method of establishing a skin color model for a digital image according to the present invention comprises the following steps. A human face detecting procedure is performed on an input image, and a human face area in the input image is circled through a selecting window. A skin color model is established according to color information in the selecting window. A skin color detecting procedure is performed, so as to detect remaining pixels having the skin color in the input image by using the skin color model established in the above step.

The present invention provides a method for detecting a skin color. Firstly, a selecting window having a human face area is circled from the input image by using the human face detecting procedure. The skin color model is then established through the human face area in the selecting window. Next, a skin color detection is performed on the remaining parts of the input image according to the skin color model and the skin color detecting procedure. In this manner, it is unnecessary to establish the corresponding skin color model for the whole input image by using a large amount of memory space. Besides, most parts of the image in the selecting window belong to the human face area, thereby greatly improving the reliability of the skin color model.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The method of the present invention is applicable to electronic devices having image processing capability, such as personal computers, digital cameras, and digital photo frames. However, it should be noted that the present invention is not limited to the above examples.

Figure 1:
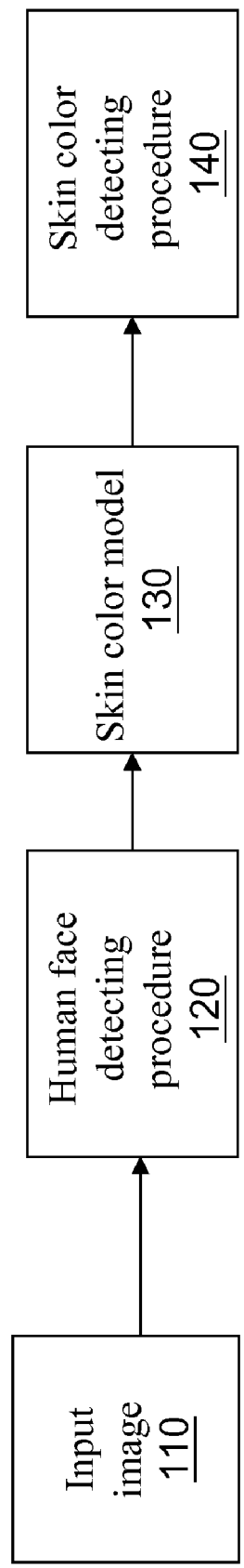
FIG. 1 is a schematic view of an architecture of the present invention.
Figure 2:
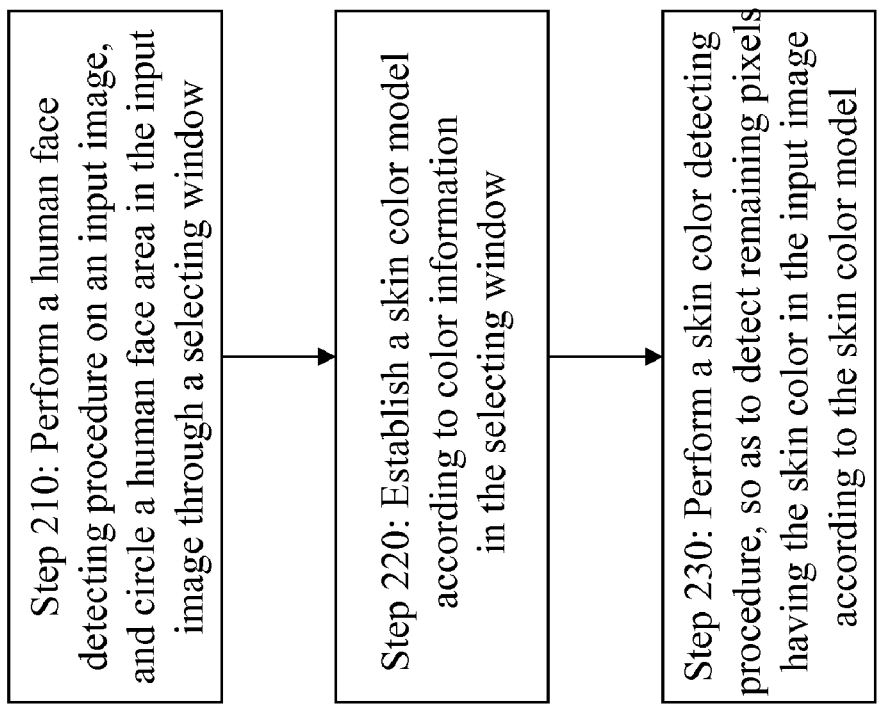
FIG. 2 is a schematic view of an operation flow of the present invention.

Referring to FIGS. 1 and 2, schematic views of an architecture and an operation flow of the present invention are respectively shown. In the present invention, the method comprises the following steps.

In Step 210, a human face detecting procedure 120 is performed on an input image 110, and a human face area in the input image 110 is circled through a selecting window.

In Step 220, a skin color model 130 is established according to color information in the selecting window.

In Step 230, a skin color detecting procedure 140 is performed, so as to detect remaining pixels having the skin color in the input image 110 according to the skin color model 130.

In Step 210 of the present invention, the method of the human face detecting procedure 120 is not limited thereto, such that a circling scope of the selecting window is determined by the human face detecting procedure 120. In addition, the number of the selecting windows may also be determined according to the human face detecting procedure 120, and in the present invention, at least more than one selecting window is required.

Figure 3:
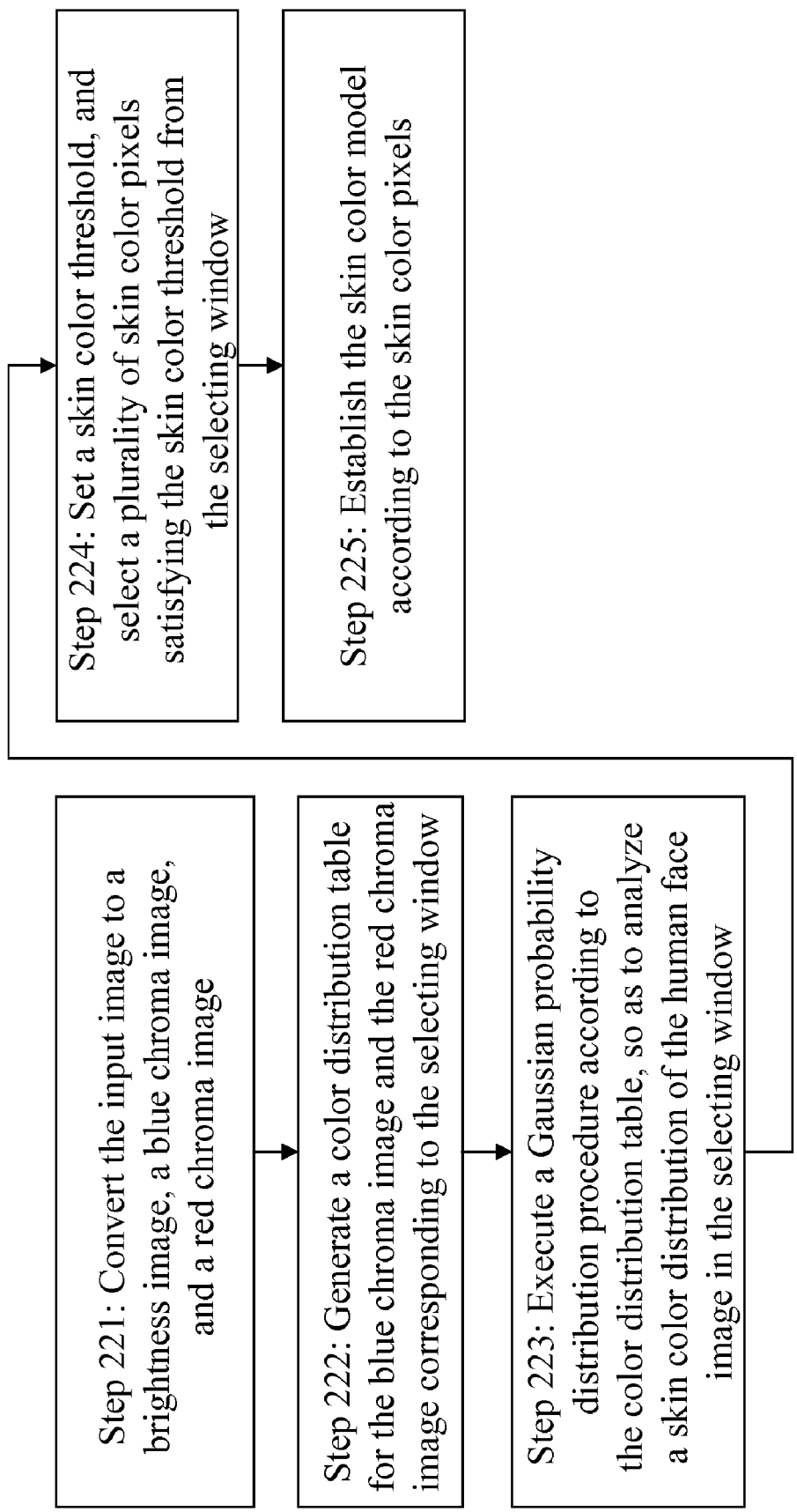
FIG. 3 is a schematic view of an operation flow of establishing a skin color model.

Referring to FIG. 3, in Step 220 of the present invention, the method of establishing the skin color model 130 further comprises the following steps.

In Step 221, the input image 110 is converted to a brightness image Y, a blue chroma image Cb, and a red chroma image Cr.

In Step 222, a color distribution table is generated for the blue chroma image Cb and the red chroma image Cr corresponding to the selecting window.

In Step 223, a Gaussian probability distribution procedure is executed according to the color distribution table, so as to analyze a skin color distribution of the human face image in the selecting window.

In Step 224, a skin color threshold is set, and a plurality of skin color pixels satisfying the skin color threshold is selected from the selecting window.

In Step 225, the skin color model 130 is established according to the skin color pixels.

Figure 4:
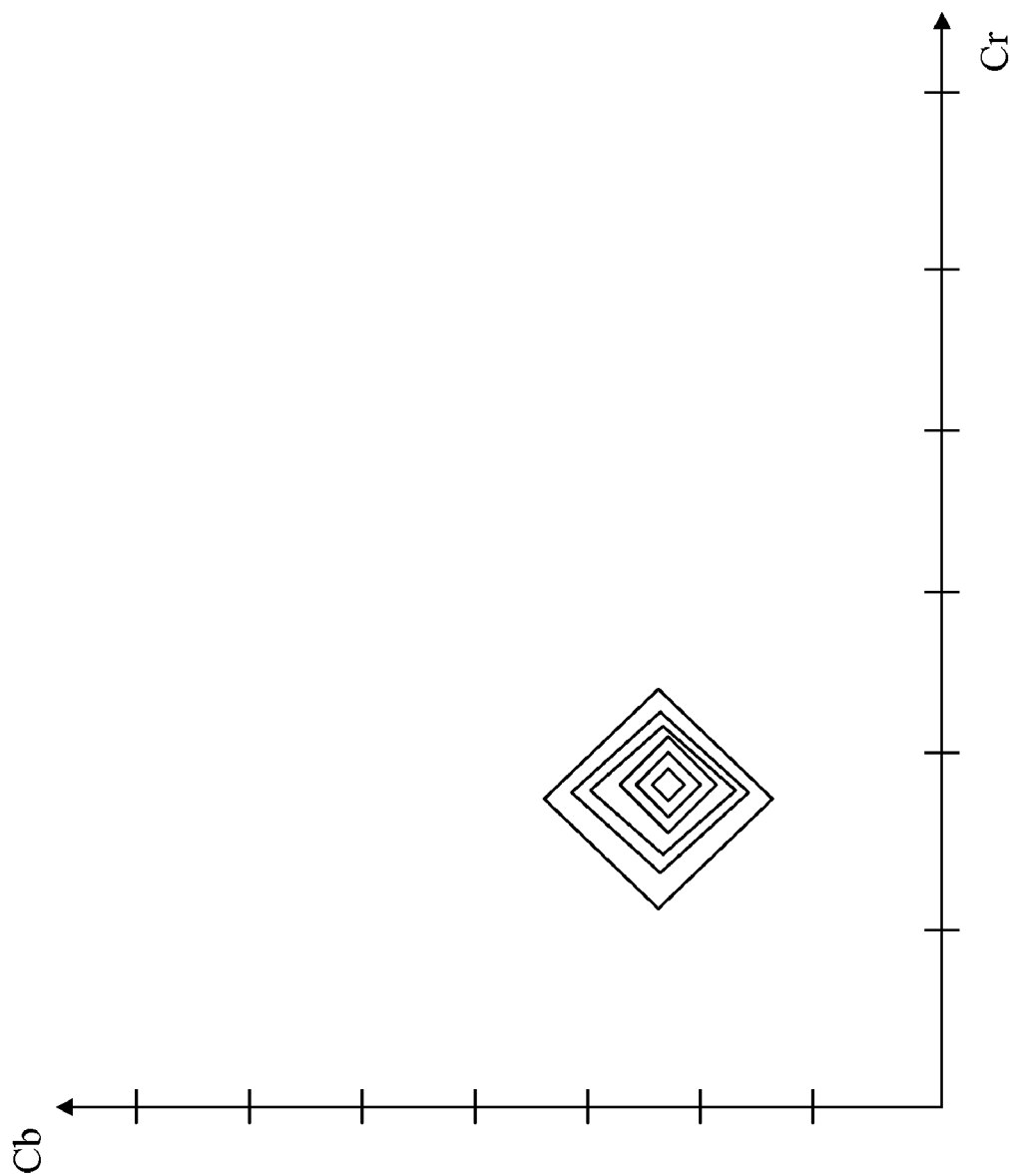
FIG. 4 is a schematic view of a color distribution table of a selecting window.

In the present invention, firstly the human face area in the input image 110 is captured by using the human face detecting procedure 120. In the human face area, the color consistency (i.e., the skin color) of the pixels is quite high, and the color of the human face area is quite different from other colors in the input image 110. Therefore, in order to further highlight the color information in the selecting window, the input image 110 is further converted to the brightness image, the blue chroma image, and the red chroma image. The color distribution table is generated for the areas of the selecting window located in the blue chroma image and the red chroma image. Referring to FIG. 4, a schematic view of the color distribution table of the selecting window is shown. In FIG. 4, a horizontal axis is defined to present red chroma values, and a vertical axis is defined to present blue chroma values. Therefore, the skin colors of the human face in the selecting window are concentrated in a certain area of FIG. 4.

Next, the color distribution table is processed by using the Gaussian distribution probability of Formula 1, and the pixels greater than the skin color threshold are selected from the selecting window. The skin color model 130 is established according to the selected pixels.

$$p(c \mid \text{Skin}) = \frac{1}{2\pi |\Sigma|^{1/2}} e^{-\frac{1}{2}(c-u)^T \Sigma^{-1}(c-u)} \quad \text{(Formula 1)}$$

C is a pixel color value, and Skin represents a skin color.

$$u = \frac{1}{n}\sum_{i=1}^{n} Ci$$

$$\sum = \frac{1}{n-1}\sum_{i=1}^{n}(c_i - \mu)(c_i - u)^T$$

Figure 5:
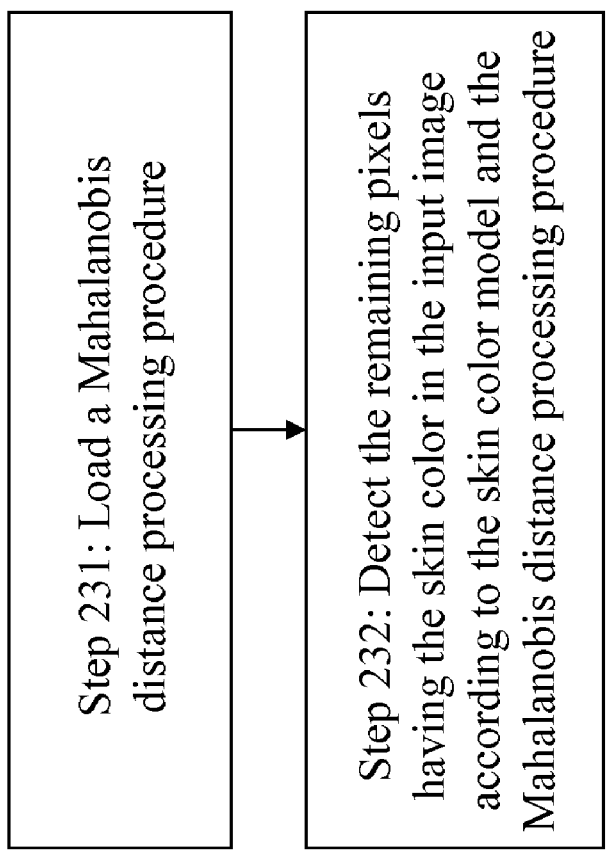
FIG. 5 is a schematic view of an operation flow of a skin color detecting procedure.

When a pixel color C is given, the similarity between C and the skin color is measured by using Formula 1. Referring to FIG. 5, the skin color detecting procedure 140 in Step 230 of the present invention further comprises the following steps.

In Step 231, a Mahalanobis distance processing procedure is loaded.

In Step 232, the remaining pixels having the skin color in the input image 110 are detected according to the skin color model 130 and the Mahalanobis distance processing procedure.

Refer to Formula 2 for the Mahalanobis distance processing procedure.

$$S(c) = (c-u)^T \Sigma^{-1}(c-u) \quad \text{(Formula 2)}$$

In Step 230, according to the skin color model 130 established in Step 220 together with the computation of the Mahalanobis distance processing procedure, it is respectively searched whether the input image 110 still has the pixels having the skin color. For example, the digital image further comprises more than two human face areas, neck, limb, trunk, and the like.

The present invention provides a method for detecting a skin color. Firstly, a selecting window having a human face area is circled from the input image 110 by using the human face detecting procedure 120. The skin color model 130 is then established through the human face area in the selecting window. Next, a skin color detection is performed on the remaining parts of the input image 110 according to the skin color model 130 and the skin color detecting procedure 140. In this manner, it is unnecessary to establish the corresponding skin color model 130 for the whole input image 110 by using a large amount of memory space. Besides, most parts of the image in the selecting window belong to the human face area, thereby greatly improving the reliability of the skin color model 130. Therefore, compared with the conventional art, the present invention occupies less memory resources, and provides a real-time processing speed for the skin color detection more easily.

What is claimed is:

1. A method of establishing a skin color model, adapted to perform a skin color detection on an input image by using the skin color model by an electronic device, the method comprising steps below in order:

performing a human face detecting procedure on the input image, and circling a human face area in the input image through a selecting window by the electronic device;

establishing the skin color model according to color information in the selecting window by the electronic device;

loading a Mahalanobis distance processing procedure by the electronic device; and detecting remaining pixels having the skin color in the input image according to the skin color model and the Mahalanobis distance processing procedure by the electronic device.

2. The method of establishing the skin color model according to claim 1, wherein the step of establishing the skin color model further comprises:

executing a Gaussian probability distribution procedure, so as to analyze a skin color distribution of the human face image in the selecting window;

setting a skin color threshold, and selecting a plurality of skin color pixels satisfying the skin color threshold from the selecting window; and establishing the skin color model according to the skin color pixels.

3. The method of establishing the skin color model according to claim 2, wherein before the step of executing the Gaussian probability distribution procedure, the method further comprises:

converting the input image to a brightness image, a blue chroma image, and a red chroma image; and generating a color distribution table for a part of the blue chroma image and a part of the red chroma image corresponding to the selecting window.

* * * * *